United States Patent
Aoki et al.

(10) Patent No.: US 6,323,443 B1
(45) Date of Patent: Nov. 27, 2001

(54) SEAT WEIGHT MEASURING APPARATUS

(75) Inventors: Hiroshi Aoki; Shigenori Maruyama, both of Shiga (JP)

(73) Assignee: Takata Corporation (JP)

( * ) Notice: Subject to any disclaimer, the term of this patent is extended or adjusted under 35 U.S.C. 154(b) by 0 days.

(21) Appl. No.: 09/326,662

(22) Filed: Jun. 7, 1999

(30) Foreign Application Priority Data

Jun. 5, 1998 (JP) .................................................. 10-172098

(51) Int. Cl.$^7$ ........................ G01G 19/52; G01G 23/02; B60R 21/32
(52) U.S. Cl. ........................ 177/144; 177/154; 280/735; 180/273
(58) Field of Search ........................... 177/136, 144, 177/154, 155, 156, 157, 184, 186, 187, 188, 189; 180/273; 280/735

(56) References Cited

U.S. PATENT DOCUMENTS

| 3,354,710 | * | 11/1967 | Johnson | 177/154 |
|---|---|---|---|---|
| 3,997,014 | * | 12/1976 | Soderholm et al. | 177/155 |
| 4,158,160 | | 6/1979 | Meiller | 318/467 |
| 4,396,079 | * | 8/1983 | Brendel | 177/180 |
| 4,657,097 | * | 4/1987 | Griffen | 177/211 |
| 4,700,656 | * | 10/1987 | Cone et al. | 177/211 X |
| 4,726,435 | * | 2/1988 | Kitagawa et al. | 177/187 |
| 5,319,161 | * | 6/1994 | Miller et al. | 177/154 |
| 5,714,695 | * | 2/1998 | Burns | 177/211 |
| 5,971,432 | * | 10/1999 | Gagnon et al. | 280/735 |
| 6,039,344 | * | 3/2000 | Mehney et al. | 280/735 |
| 6,069,325 | * | 5/2000 | Aoki | 177/136 |

FOREIGN PATENT DOCUMENTS

| 0 796 768 A1 | 9/1997 | (EP) . |
|---|---|---|
| 0 950 560 A2 | 10/1999 | (EP) . |
| 11-1153 | 1/1999 | (JP) . |
| WO 98/25112 | 6/1998 | (WO) . |
| WO 98/35861 | 8/1998 | (WO) . |

* cited by examiner

Primary Examiner—Randy W. Gibson
(74) Attorney, Agent, or Firm—Foley & Lardner

(57) ABSTRACT

To provide a seat weight measuring apparatus capable of improving the safety against an abnormal force acting on the seat. A seat weight measuring apparatus (5) includes seat connecting mechanisms (17) arranged between seat fixing portions (19) of a vehicle and a seat (3), and load sensors (13) which detect the seat weight loaded on the mechanisms. It further includes displacement restriction mechanisms (25) that restrict the displacement of the seat (3) relative to the seat fixing portions (19). When the load sensors receive a force exceeding a predetermined level, the excess load is borne by the displacement restriction mechanisms instead of the load sensors.

15 Claims, 11 Drawing Sheets

(A)

(B)

SEAT WEIGHT MEASURING APPARATUS

BACKGROUND OF THE INVENTION

1. Field of the Invention

The present invention relates to an apparatus for measuring the weight of a vehicle seat including the weight of a passenger sitting thereon, and more particularly to a seat weight measuring apparatus capable of increasing the safety against an abnormal force acting on the seat, or of alleviating a strength requirement for load sensors. The present invention also relates to a seat weight measuring apparatus having advantages in that the dimensional precision requirements for component parts or installing portions of the apparatus are about the same as the current level for other parts around the seat, or in that an overall thickness of the apparatus can be decreased.

2. Description of the Related Art

Automobiles are equipped with seat belts and airbags to secure safety for passengers. In recent years, there is a trend for controlling the operation of such safety devices according to the weight of a passenger for improved performance of seat belts and airbags. For example, the amount of gas to be introduced into the airbag, an airbag inflating speed, or a pre-tension of the seat belt may be adjusted according to the weight of a passenger. For that purpose, some means are needed for measuring the weight of a passenger sitting on the seat. An example of such means includes a proposal (Japanese Patent Application No. 9-156666 filed by the applicant of this invention) which involves arranging load sensors (load cells) at four corners of the seat under seat rails and summing vertical loads acting on the load cells to measure the seat weight including the weight of the passenger.

The load sensors of the seat weight measuring apparatus described above are preferably physically small with a measuring capacity of up to 50 kg. Such load sensors may include: sensors having a strain gauge attached to (or formed on) a sensor plate that flexes when loaded; piezoelectric type sensors; and capacitance type sensors that detect displacements of an elastic member that flexes when loaded.

However, the deflection strokes of the load sensors described above are very small, and a very high dimensional precision of the members around the sensor is required for a normal functioning of the sensor. In addition, special care should be taken during assembly, to prevent giving an unbalanced displacement to a sensor.

From a strength viewpoint, fixing structures between seat connecting mechanisms and seat fixing portions are required to have a breaking load of 2300 kgf at a seat belt anchoring portion. If the load sensor itself is required to have this breaking load, the rigidity and strength of the sensor have to be very high, making it extremely expensive. In addition, the deflection stroke described above tends to become even smaller. Further, the size of the sensor may become too large to be installed between the seat connecting mechanisms and the seat fixing portions (seat brackets of the chassis).

SUMMARY OF THE INVENTION

An object of the present invention which is made in view of the above-described problems is to provide an apparatus for measuring the weight of a vehicle seat including the weight of a passenger sitting thereon, having advantages including reducing the dimensional precision requirements for component parts or fixing portions, or decreasing the overall thickness of the apparatus. Another object of the present invention is to provide a seat weight measuring apparatus capable of decreasing processing cost and assembly cost. A further object of the present invention is to provide a seat weight measuring apparatus capable of increasing the safety against an abnormal force acting on the seat. A still further object of the present invention is to provide a seat weight measuring apparatus capable of weight measurement with higher precision.

BRIEF DESCRIPTION OF THE DRAWINGS

FIGS. 2(A) & 2(B) show the construction of a seat weight measuring apparatus according to an embodiment of the present invention, in which FIG. 2(A) is a general sectional side view and FIG. 2(B) is a plan view of a sensor plate.

FIGS. 5(A) & 5(B) show a construction example of a seat weight measuring apparatus according to a further embodiment of the invention, in which FIG. 5(A) is a plan view of a sensor plate and FIG. 5(B) is a circuit diagram of a strain gauge circuit.

FIGS. 6(A) & 6(B) show the construction of a seat weight measuring apparatus according to a further embodiment of the present invention in which FIG. 6(A) is a general sectional side view and FIG. 6(B) is a plan view of a plate spring.

FIGS. 7(A) & 7(B) show the construction of a seat weight measuring apparatus according to a further embodiment of the present invention in which FIG. 7(A) is a general sectional side view and FIG. 7(B) is a plan view showing a sensor plate and plate spring.

FIGS. 9(A) & 9(B) show a seat weight measuring apparatus according to a further embodiment of the present invention having a cantilever construction, in which FIG. 9(A) is a sectional side view and FIG. 9(B) is a plan view of a plate spring.

FIGS. 12(A) & 12(B) show an example of a variation of the sensor plate, in which FIG. 12(A) is a plan view of a sensor plate and FIG. 12(B) is a circuit diagram of the strain gauges.

DETAILED DESCRIPTION OF THE PREFERRED EMBODIMENTS

Figure 1:
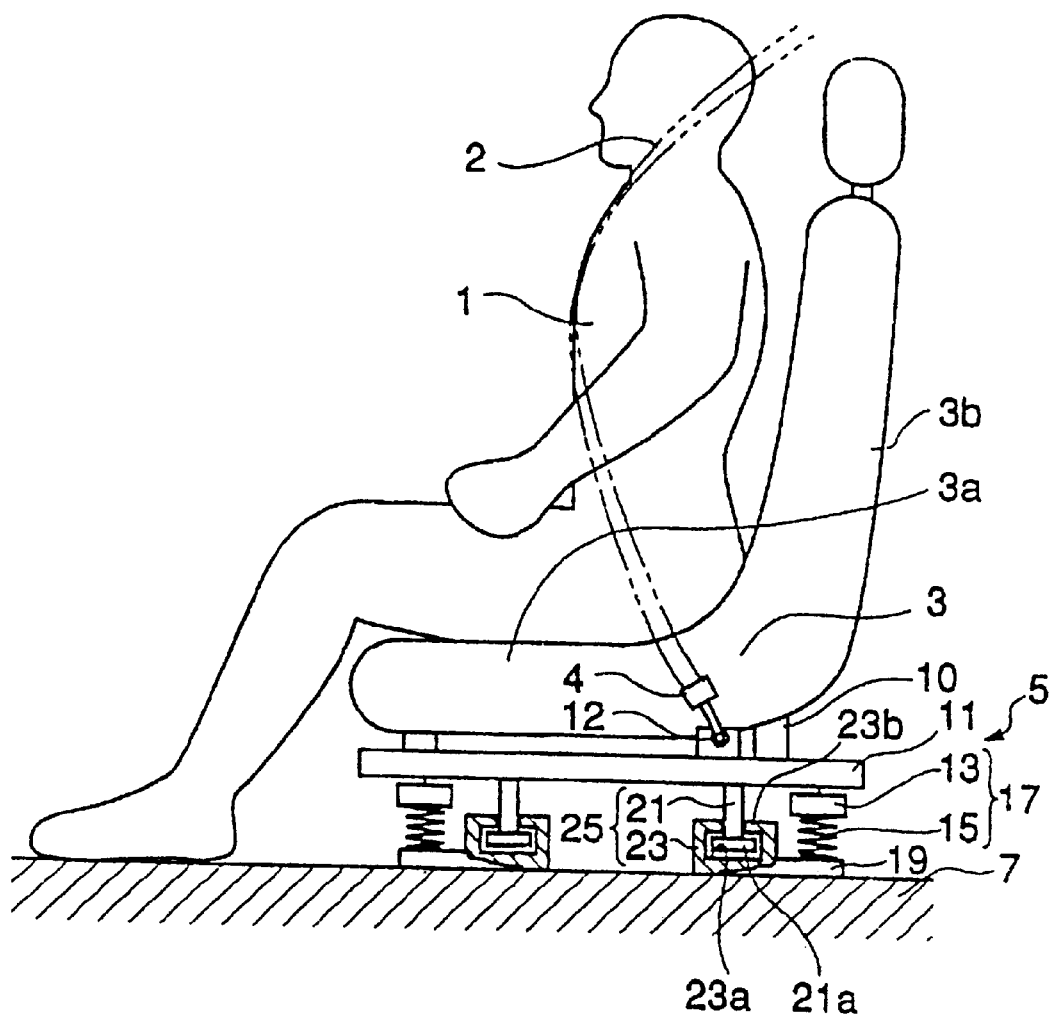
FIG. 1 is a side view schematically showing the overall construction of a seat weight measuring apparatus according to one embodiment of the present invention.

In order to solve the problems described above, the present invention provides an apparatus for measuring the weight of a vehicle seat including the weight of a passenger sitting thereon, characterized in that it comprises seat connecting mechanisms arranged between the seat and seat fixing portions of a vehicle, load sensors sensing the seat weight loaded on the seat connecting mechanisms, and displacement restriction mechanisms for restricting the displacement of the seat relative to the seat fixing portions caused by the deflections of said seat connecting mechanisms and/or load sensors in a predetermined range.

In the present invention, the displacement restriction mechanisms arranged between the seat and the seat fixing portions restrict the relative displacement between them in a certain range so that, when a force exceeding a predetermined level (for instance, exceeding a measurement range) acts on the load sensors, the excess load is born not by the load sensors but by the displacement restriction mechanisms (load restriction mechanisms). In this way, the safety is increased against an abnormal force acting on the load sensors, while the strength requirement for the load sensors can be alleviated.

Meanwhile, the object of what is referred to as the seat weight measuring apparatus in this specification is basically to measure the weight of a passenger on the seat. Therefore, an apparatus that measures only the weight of a passenger by canceling the weight of the seat itself is included in what is referred to as seat weight measuring apparatus in this specification.

In the present invention, it is preferable that the deflection strokes of said seat connecting mechanisms and/or said load sensors corresponding to the load variation within the measuring range or the loading range of the load sensors are set at 0.5–8 mm. In other words, the range of the displacement permitted by the displacement restriction mechanisms is preferably ±0.25–4 mm with respect to a normal state.

At this range of displacement stroke, the current level of dimensional precision of the seat connecting mechanisms and seat brackets does not impair the incorporation of the seat weight measuring apparatus between the seat and the seat fixing portions. From this view point, it is more preferable that the deflection stroke is larger than 1 mm (±0.5 mm).

As a means to obtain the deflection stroke described above, deflection members can be incorporated in said seat connection mechanisms. By the action of the deflection members incorporated in the seat connection mechanisms, the deflection strokes of the seat connecting mechanisms within the measuring range can be amplified. As a result, the requirements of the dimensional precision or installation precision of the members constituting the seat connecting mechanism or the displacement restriction mechanisms can be alleviated.

The seat weight measuring apparatus according to an embodiment of the present invention is an apparatus for measuring the weight of a vehicle seat including the weight of a passenger sitting thereon characterized in that it comprises seat connecting mechanisms arranged at four corners of the seat between the seat fixing portions and the seat rails, load sensors sensing the seat weight loaded on respective seat connecting mechanisms, and displacement restriction mechanisms restricting the displacement of the seat connecting mechanisms relative to the seat fixing portions in a certain range.

In the case that anchoring portions fixing anchors or a seat belt (buckle) are connected to the seat rails or seat, the displacement restriction mechanisms may be provided only at locations near the anchoring portions. Alternatively, the displacement restriction mechanisms may be provided at a plurality of locations including those near the anchoring portions, and only the displacement restriction mechanisms near the anchoring portions may be made robust enough to withstand the tensile force of the seat belt of some 2300 kg.

That is to say, a full load is born by the load sensors for locations with comparatively low breaking loads, and the deflection restriction mechanisms are installed only at the locations with the highest breaking loads. Alternatively, the deflection restriction mechanisms at the anchoring portions are made particularly robust. In this way, the overall weight of the seat weight measuring apparatus can be reduced.

A seat weight measuring apparatus according to another embodiment of the present invention is characterized in that each load sensor sensing the seat weight loaded on each respective seat connecting mechanisms is provided with a strain sensing member having a plurality of strain gauges which are arranged symmetrically relative to the central axis of said member, a bridge circuit consisting of said strain gauges being constructed so that it does not output the twisting strain around said central axis of the member.

Otherwise, it is characterized in that slits are formed at sides of the region to which the strain gauges are attached.

With these constructions, weight measurements with high precision and linearity can be achieved.

An explanation will be made in the following with reference to the drawings.

FIG. 1 is a side view schematically showing the overall construction of a seat weight measuring apparatus according to one embodiment of the invention.

Through this specification, the words front, rear, left and right refer to front, rear, left and right as seen by a passenger (1), respectively.

Shown in the figure are a seat (3), a passenger (1) on the seat, and a seat weight measuring apparatus (5) installed below the seat. The seat (3) comprises a seat cushion (3a) on which the passenger (1) is seated, and a seat back (3b) for supporting the back of the passenger. Seat adjusters (10) project from the bottom of the seat cushion (3a) at four locations, front and rear on both sides. While only two adjusters (10), front and rear on the left side, are shown in the figure, the right side adjusters (10) are hidden on the far side. Such an illustrate relation is also true for other portions to be described below. The seat adjusters (10) are portions of the seat frame that project from the seat (3), capable of sliding along seat rails (11) in the longitudinal direction when adjusted by the passenger (1).

The seat rails (11) are members which extend in the longitudinal direction of a vehicle body and have a grooved cross section (not shown) in which the lower end portions of the seat adjusters (10) slide. There are two seat rails (11), one on each lateral side, under the seat cushion (3a). In a conventional seat without seat weight measuring apparatus, the seat rails (11) are securely fixed by bolts to seat brackets of a chassis of a vehicle body. At a rear part of the seat rails (11), an anchoring portion (12) for fixing a buckle (4) of a seat belt (2) is provided. The anchoring portion (12) is loaded with a tension of a seat belt (2). The anchoring portion (12) has a breaking load of 2300 kgf taking into consideration of a case of a vehicle collision.

Under the seat rail (11), two seat weight measuring apparatus (5) are provided, one at the front portion and one at the rear portion of the seat rail. It should be noted that under the right side seat rail, there are also provided two seat weight measuring apparatus (5) which are not shown. Thus, the seat weight measuring apparatus (5) are provided at four locations, front and rear on both sides, below the seat (3).

Each of the seat measuring apparatus (5) comprises a seat connecting mechanism (17) and a displacement restriction mechanism (25), and is arranged between the seat rails (11) and the seat fixing portions (19). In this embodiment, each of the seat connecting mechanism (17) comprises a load sensor (13) and a deflection member (15), connected in series connection. The load sensor (13) is a strain gauge type or capacitance type sensor that detects the load received by the seat connecting mechanism (17). The deflection member (15) is a member for amplifying the displacement (movement) of the seat rail (11) upon loading of the passenger weight. The deflection member (15) can be constructed with spring, rubber, gas cushion and the like. Examples of specific constructions of the sensor (13) and the deflection member (15) will be described later.

In this embodiment, each of the displacement restriction mechanism (25) comprises a restriction bar (21) connected to the lower surface of the seat rail (11) and a restriction block (23) formed on the seat fixing portion (19). An end portion (21a) of the restriction bar (21) is enlarged in diameter in a flange-like configuration. The restriction block (23) has an internal recess (23a) and a flange (23b), extending inward, formed at the upper end of the recess. The en portion (21a) of the restriction bar is contained within the recess (23a) of the restriction block, keeping a certain gap on all longitudinal and lateral surfaces.

When an abnormal load is applied to the seat rails (11), deforming the load sensor (13) and the deflection member (15) over a certain limit, the end portion (21a) of the restriction bar of the displacement restriction mechanism (25) abuts against an internal wall of the recess (23a) of the restriction block. For instance, when the passenger (1) moving forward during a vehicle collision is restrained by the seat belt (2), the seat belt (2) receives a tension force caused by the inertia force of the passenger (1). At this time, the restriction bar (21) is pulled upward but the movement is stopped when the end portion (21a) of the restriction bar abuts against the lower surface of the flange (23b) of the restriction block. Thus, when the load sensor receives a force exceeding a predetermined value (for instance, exceeding a measuring range), the excess load is born by the displacement restriction mechanism (load restriction mechanism), instead of the load sensor. As a result, the breaking load requirement for the load sensor (13) can be very low, achieving the down-sizing and cost-reduction of the load sensor.

Hereinafter, the relation between the displacement restriction mechanism (25) and the deflection member (15) of the seat connecting mechanism (17) will be described. If the deflection member (15) is absent (if a rigid member is used), and deformation of load sensor (13) over the measuring range is in the order of 0.1 mm as described earlier, the gap between the end portion (21a) of the restriction bar of the displacement restriction mechanism (25) and the recess (23a) of the restriction block should also be in the order of 0.1 mm, because the end portion (21a) of the restriction bar is required to abut against the internal surface of the recess (23a) of the restriction block as soon as the load exceeds the measuring range, so that the excess load is born by the displacement restriction mechanism (25).

That is to say, the displacement restriction mechanism is required to have an operational precision in the order of 0.1 mm corresponding to the stroke of the load sensor, which in turn requires the parts' dimensional precision and assembly precision to be on the order of 0.01 mm. This requirement cannot be fulfilled at all with current dimensional precision of the parts around the vehicle seat, which mainly consist of pressed products. In short, the small deflection stroke of the load sensor calls for a high dimensional precision in the displacement restriction mechanism and those members used around it. To solve this problem, the deflection stroke of this embodiment of the seat connecting mechanism in the measuring range or loading range of the load sensor is amplified by the action of the deflection member of the seat connecting mechanism. As a result, the dimensional precision and assembly precision requirements for the members constituting the seat connecting mechanism and the displacement restriction mechanism can be alleviated.

Hereinafter, specific examples of the seat connecting mechanism and the displacement restriction mechanism will be described.

FIGS. 2(A), 2(B) show the construction of a seat weight measuring apparatus load sensor according to an embodiment of the present invention, in which FIG. 2(A) is a general sectional side view and FIG. 2(B) is a plan view of a sensor plate.

Shown in the uppermost portion of FIG. 2(A) is a seat rail (11). Under the seat rail (11), a sensor frame upper plate (51) and a sensor frame (53) are fixed by means of bolts (52). The sensor frame upper plate (51) is a robust plate having a hole (51a) at the center. The sensor frame (53) has a saucer-like configuration with a recessed central portion. Formed at the upper external periphery of the frame (53) is a flange (53a) which is fixed to the sensor frame upper plate (51) by means of the bolts (52), as described above. The bottom plate (53b) of the sensor frame (53) is provided with a hole (53c) formed at the center thereof.

A sensor plate (57), which is referred to in this specification as a detecting member, is fixed by means of bolts (55) to the lower surface of the sensor frame upper plate (51). The sensor plate (57) is made of a stainless steel and is a rectangular plate with a thickness of 3 mm, a width of 20 mm, and a length of 80 mm. As shown in FIG. 2(B), the sensor plate (57) is provided with a central shaft hole (57c) formed in the central portion and with bolt holes (57a) formed in the both side portions. Attached to the upper surface of the sensor plate (57) are strain gauges (57b), a pair of them being attached on each front and rear portions of the plate (left and right portions in FIG. 2(B)). These strain gauges (57b) are for measuring the load acting on the sensor plate (57), by detecting the strain of the plate (57). In addition, instead of detecting the strain of the sensor plate (57) by strain gauges (57b), the deflection of the sensor plate (57) can be detected by a capacitance type sensor or a Hall element, followed by conversion of the deflection to the strain.

Fitted into the hole (57c) located at the center of the sensor plate (57) is a central shaft (59). The sensor plate (57) and the central shaft (59) are fixed to each other by means of a nut (59a). Inserted in the holes (57a) located at both sides of sensor plate (57) are bolts (55) upward, fixing the sensor plate (57) to the sensor frame upper plate (51).

The central shaft (59) is a cylindrical shaft having several steps and flanges and comprises those parts and portions as, from its upper side, the upper nut (59a), a flange (59b), a sensor frame penetrating portion (59c), a small diameter portion (59d), and a lower nut (59e).

The upper nut (59a) fixes the sensor plate (57) as described above. The nut (59a) enters into the central hole (51a) of the sensor frame upper plate (51). In the nominal state, the gaps between the nut (59a) and the hole (51a) are, for example, 0.25 mm in the longitudinal direction and 0.5 mm in the radial direction. When the seat rail (11) receives a large force and parts including the plate (57) are deformed in some extent, the nut (59a) abuts against the internal surface of the hole (51a). At this point, the further deformation of the sensor plate (57) is stopped. That is, the nut (59a) on the central shaft and the central hole (51a) of the sensor upper frame constitute the displacement restriction mechanism of the present invention.

The outer diameter of the flange (59b) of the central shaft (59) is greater than the diameter of the central hole (53c) of the sensor frame (53), the lower surface of the flange (59b) facing the upper surface of the sensor frame bottom plate (55(53b) with a gap of 0.25 mm in the nominal state. When the seat rail (11) receives a force acting upward and the deformation of the sensor plate (57) advances, the sensor frame (53) is lifted and the central upper surface (53d) of the frame bottom plate (53b) abuts against the bottom surface of the central shaft flange (59b). Meanwhile, a gap of 0.7 mm exists between the outer periphery of the sensor frame penetrating portion (59c) of the central shaft (59) and the inner periphery of the sensor frame central hole (53c) in the nominal state. This portion also constitutes the displacement restriction mechanism of the present invention.

The small diameter portion (59d) of the central shaft (59) extends downward decreasing its diameter stepwise. The nut (59e) is fitted onto the end of the small diameter portion (59d). Fitted onto the outer periphery of the small diameter portion (59d) are, from its upper side, a washer (61), a rubber washer (63), a sensor base (65), another rubber washer (63), and another washer (61). The washers (61) are made of metal. The rubber washers (63) expand and contract by about 0.5 mm in the sum of two sheets, upper and lower, for a load variation of about 50 kgf s in the vertical direction. The rubber washers (63) serve to absorb dimensional difference and strain between the seat rail (11) and the seat connecting portion (a seat bracket (67)). The sensor base (65) is a metal plate and comprises a lowermost member of the seat weight measuring apparatus of this embodiment. The upper and lower washers (61), the upper and lower rubber washers (63), and the sensor base (65) are retained between the lower step of the sensor frame penetrating portion (59c) of the central shaft (59) and the lower nut (59e).

The end (65b) of the sensor base (65) is fixed to the seat bracket or seat frame (67) by means of a bolt which is not shown. The seat bracket (67) projects from the chassis.

Figure 2:
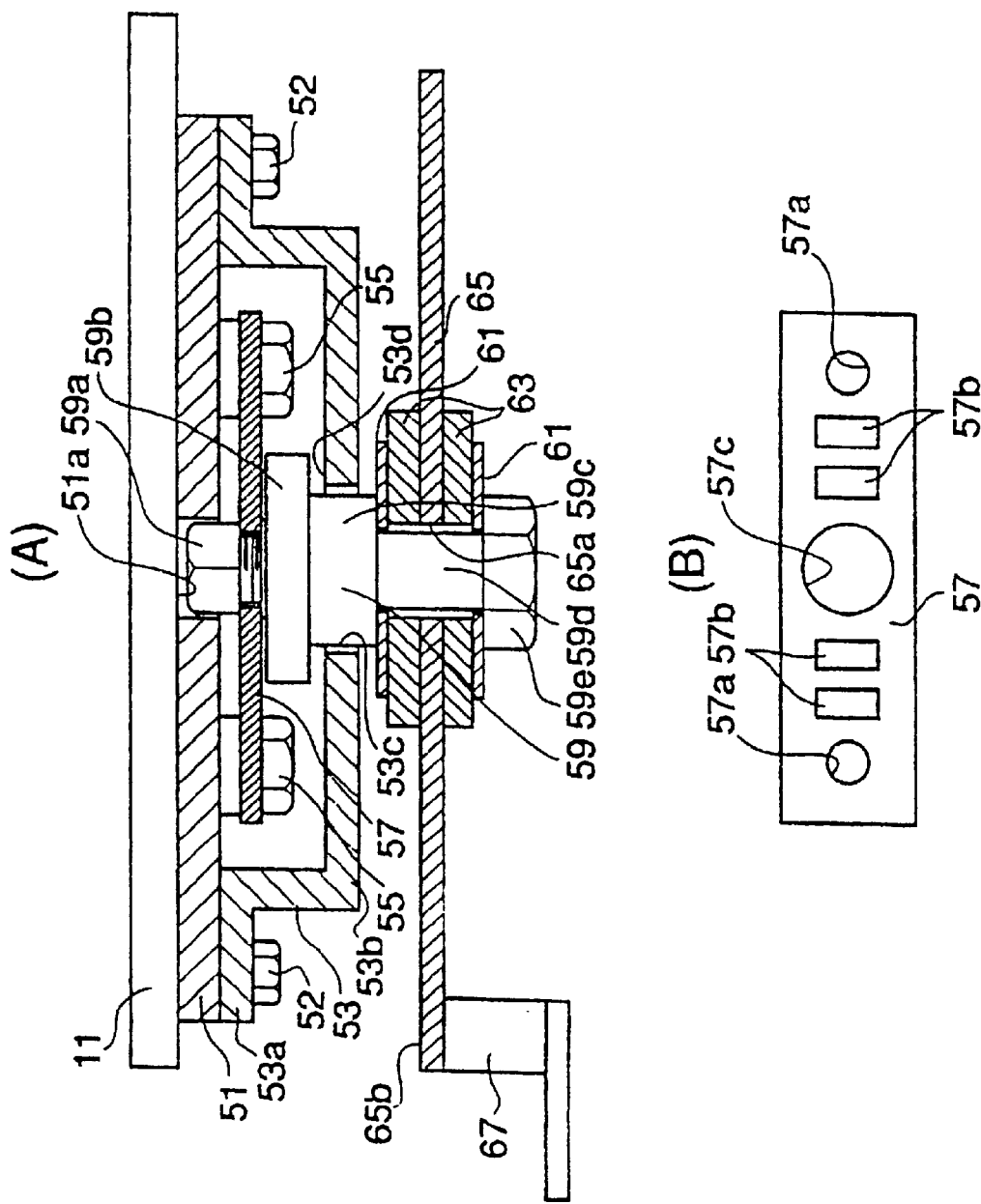

The general action of the seat weight measuring apparatus according to the embodiment of FIG. 2 will be summarized.

The weight of a seat and a passenger loaded on the seat rail (11) are normally transmitted via the sensor plate (57) to the central shaft (59), the rubber washers (63), the sensor base (65), and the seat bracket (67). At this time, the sensor plate (57) gives rise to a deflection roughly proportional to the load which is detected by the strain gauges (57b), to measure the load acting on the sensor plate (57) in the vertical direction. The weight of the passenger is obtained by summing the load measured by each load sensors, front and rear on both sides, and subtracting from the sum the known weights of the seat, the seat rail and the like.

Meanwhile, when an abnormal force exceeding the measuring range or load limit of the load sensor acts on the seat rail (11), the central shaft nut (59a) abuts against the internal surface of the central hole (51a), or otherwise, the central shaft flange (59b) or the sensor frame penetrating portion (59c) abuts against the sensor frame bottom plate (53b). This action of the displacement restriction mechanism prevents the sensor plate (57) from excessive deformation while securely connecting the seat rail (11) and the seat bracket (67).

Figure 3:
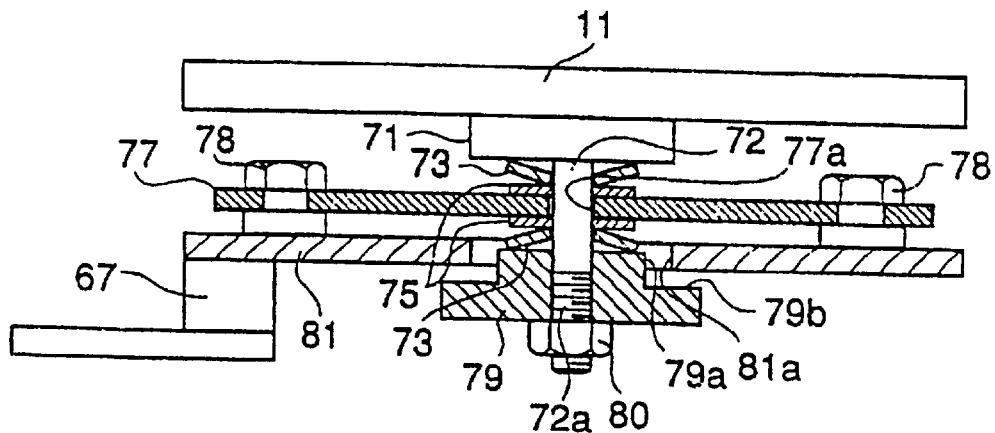
FIG. 3 is a sectional side view of a seat weight measuring apparatus according to a another embodiment of the invention.

FIG. 3 is a sectional side view of a seat weight measuring apparatus according to another embodiment of the invention.

In this embodiment, a pedestal (71) is fixed onto the lower surface of the seat rail (11). A central shaft (72) projects downward at the lower central portion of the pedestal (71), penetrating a central hole (77a) of a sensor plate (77). Fitted onto the periphery of the central shaft (72) between the pedestal (71) and the sensor plate (77) are a conical spring (73) and a washer (75). Fitted onto the periphery of the central shaft (72) under the sensor plate (77) are a washer (75), a conical spring (73) and a retainer (79), in this order. The lower surface of the retainer (79) is held by a nut (80) which engages with thread (72a) of the central shaft.

The conical spring (73) comprises the member referred to in this specification as the deflection member, and offers a margin of movement between the seat rail (11) and the seat bracket (67). For example, when the sensor plate (77) receives a load variation of 50 kg, the deflection of the sensor plate in the vertical direction is 0.5 mm, and the deflection of the two conical springs (73) in the vertical direction is ±0.5 mm. Thus, the displacement of the seat rail (11) relative to the seat bracket (67) attains to ±1.5 mm. The maximum measuring load for each load sensor is preferably about 150 kg, and the effective measuring load is preferably about 100 kg.

Both side portions of the sensor plate (77) are fixed onto the sensor base (81) using by bolts (78). As described above, the central portion of the sensor plate (77) is connected to the pedestal (71) and the central shaft (72) via the conical springs (73).

The sensor base (81) is a member extending substantially in parallel with the seat rail (11). As described above, the sensor plate (77) is fixed onto the sensor base (81). Ends of the sensor base (81) are fixed to the seat bracket (67). The sensor base (81) is provided with a hole (81a) formed therein for receiving the upper portion (79a) of the retainer (79).

In the seat weight measuring apparatus according to this embodiment, a gap of 0.5 mm is kept between the outer periphery of the upper portion (79a) of the retainer (79) and the hole (81a) of the sensor base (81). Likewise, a gap of 1.5 mm is kept between the upper surface of the flange (79b) of the retainer (79) and the lower surface of the sensor base (81). In addition, the outer diameter of the retainer flange (79b) is larger than the diameter of the sensor base hole (81a), and the periphery of the flange (79b) faces the lower surface of the sensor base (81). When a force exceeding a predetermined value (100 kgf) acts on the seat rail (11), the sensor plate (77) and the conical springs (73) deform and the upper portion (79a) of flange (79b) of the retainer (79) abuts against the hole (81a) or the lower surface of the sensor base (81). In this way, the displacement of the seat rail (11) relative to the seat bracket (67) is restricted.

In addition, the construction of seat rail (11) and the sensor base (81) can be reversed by providing the displacement restriction mechanism at the seat rail (11).

The features of this embodiment will be summarized as follows.

1. The conical springs (73) and the sensor plate (77) are connected in series connection between the seat rail (11) and the seat bracket (67), making the displacement between them caused by the load variation between the rail and the bracket comparatively large. The displacement corresponding to a load variation of 50 kg is set at 0.5 mm, preferably larger than 1 mm, and more preferably about 2 mm. In this way, the gap of the displacement restriction mechanism (the gap between the retainer (79) and the sensor base (81)) can be widened, thereby realizing a seat weight measuring apparatus which functions effectively even with component parts with a large dimensional tolerance. In addition, it can be easily installed onto the seat bracket (67) which is a pressed product.

2. The load sensor is mainly composed of a plate-like strain detecting member (sensor plate (77)), and the deflection member comprises the conical springs (73) connected in series connection to the sensor plate (77). There is no frame or casing covering the sensor plate (77). In addition, most of the displacement restriction mechanism is installed underneath, that is, at the location lower than, the sensor base (81). Accordingly, the overall thickness of the seat weight measuring apparatus can be decreased, facilitating the installation between the seat rail and the seat bracket.

Figure 4:
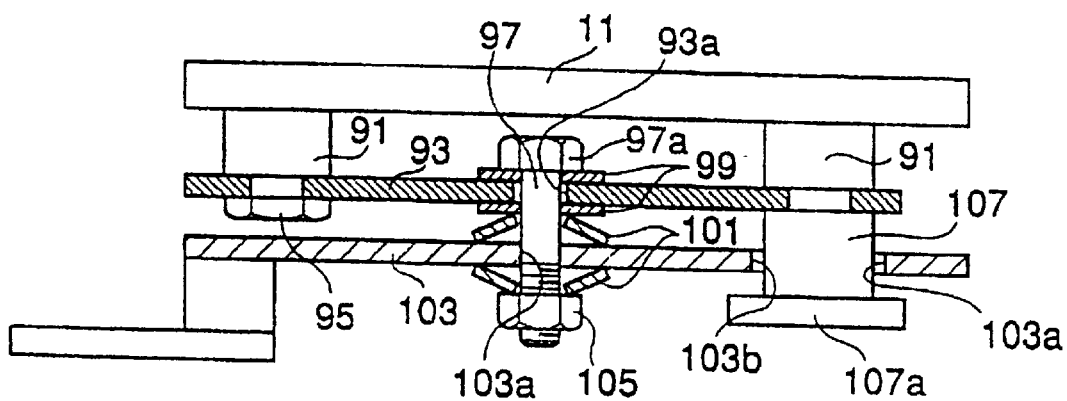
FIG. 4 is a sectional side view showing the construction of a seat weight measuring apparatus according to a further embodiment of the invention.

FIG. 4 is a sectional side view showing the construction of a seat weight measuring apparatus according to further another embodiment of the invention.

From the lower surface of a seat rail (11), two pedestals (91) project at the front and the rear. Both ends of the sensor plate (93) are fixed to the pedestal (91) by means of a bolt (95) or the like.

A central shaft (97) penetrates a central hole (93a) of a sensor plate (93). The central shaft (97) further extends downward to penetrate a hole (103a) of a sensor base (103).

The upper end of the central shaft comprises a bolt head (97a). Fitted onto the upper outer periphery of the central shaft (97) are washers (99) sandwiching the sensor plate (93). Likewise, fitted onto the lower outer periphery of the central shaft (97) are conical springs (101) sandwiching the sensor base (103). The lower end of the central shaft (97) has a threaded portion with which a nut (105) is engaged.

A restriction rod (107) projects downward from the lower end of the pedestal (91) to which the rear end portion of the sensor plate (93) is fixed. The rod (107) extends downward penetrating a restricting hole (103a) provided at the sensor base (103). Formed at the lower end of the rod (107) is a flange (107a). The longitudinal and lateral displacements of the seat rail (11) and the sensor base (103) are restricted by the abutting of the side surface of the restriction rod (107) against the inner surface of the restricting hole (103a). The upward displacement in which the seat rail (11) is lifted up is restricted by the abutting of the upper surface of the restricting rod flange (107a) against the lower surface of the sensor base (103). Likewise, the downward displacement of the seat rail (11) is restricted by the abutting of the head of the bolt (95) under the front pedestal (91) against the upper surface of the sensor base (103).

The feature of the embodiment of FIG. 4 is as follows.

The displacement restricting mechanism (the bolt (95), the restriction rod (107), the restricting hole (103a)) is arranged offset from the center of the load (the center of the sensor plate (93) and the central shaft (97)). This arrangement offers an advantage that the freedom in design is enlarged in which the displacement stroke may be increased or the overall thickness may be decreased. Further, when a horizontal force acts on the sensor plate (93) in the longitudinal or lateral direction, the sensor plate (93) gives rise to a twisting strain which is symmetrical in longitudinal or lateral direction. The resistance variation caused by the twisting strain can be canceled by arranging the strain gauges symmetrically in longitudinal and lateral direction relative to the central axis of the sensor plate (93). As a result, the horizontal force acting on the sensor plate (93) does not influence the overall output of the strain gauge constructed in a bridge circuit, the overall signal of the sensor only indicating the vertical load.

FIGS. 5(A) & 5(B) show a construction example of a seat weight measuring apparatus sensor plate according to a further embodiment of the invention, in which FIG. 5(A) is a plan view of a sensor plate and FIG. 5(B) is a circuit diagram of a strain gauge circuit. The sensor plate (111) is substantially a rectangular plate with rounded corners. In this embodiment, it is made of stainless steel and has a length of 80 mm, a width of 40 mm, and a thickness of 3 mm.

At the central portion of the sensor plate (111), a central shaft hole (111c) having a diameter of 10 mm is provided. At both end portions of the sensor plate (111), bolt holes (111a) of which diameter is 8 mm are provided. Attached to portions between the central shaft hole (111c) and the both bolt holes (111a) are strain gauges (113) in twos or in fours. On both sides of the regions in which strain gauges (113) are attached and of the central shaft hole (111c), slits (111b) are formed side by side, along the longitudinal direction of the sensor plate (111). The slits (111b) extend in parallel with the longitudinal axis of the sensor plate in the region in which strain gauges (113) are attached, with an interval between each other of 3 mm. At the periphery of the central shaft hole (111c), the slits (111b) form arches having a center in common with the hole. The purpose of these slits is to prevent the decrease in linearity of the sensor output caused by the tension force between the sensor plate fixing s, which accompanies the vertical received by the sensor plate.

Figure 5:
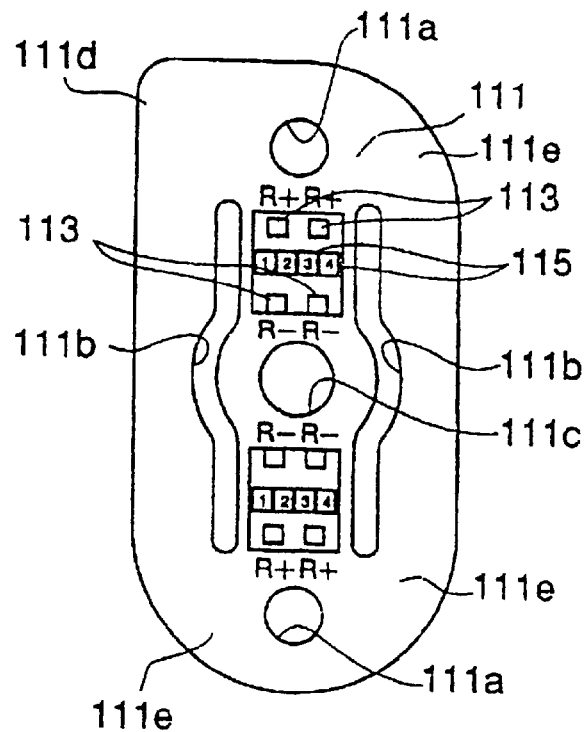
Figure 5:
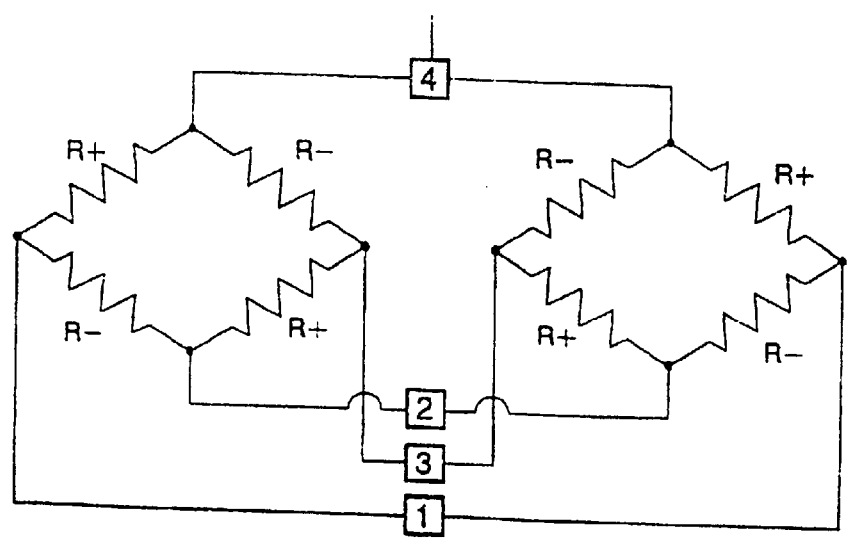

The strain gauges (113) are arranged symmetrically in longitudinal and lateral directions relative to the center of the central shaft hole (111c). The four strain gauges on each sides are arranged in two groups, that is, two compression side strain gauges R–, R– toward the central shaft hole (111c) (toward the center) and two tension side strain gauges R+, R+ toward the bolt hole (111a) (toward the end). As shown in FIG. 5, the two bridge circuits each consisting of four strain gauges on both sides are connected in parallel connection. In the figure, the numerals 1,2,3,4 in squares indicate terminals (115). By constructing the circuit in which the strain gauges are arranged in the above-described manner, the twisting strain around the central shaft hole (111c) is not output from the sensor circuit.

By arranging four strain gauges on each side as shown in the embodiment, such effects as decreased sensitivity fluctuation are obtained, but principally, arranging two strain gauges on each side is sufficient.

In order to stabilize the surface strain in the strain gauge region and to decrease the sensitivity fluctuation, the sensor plate can be constructed as follows.

Figure 12:
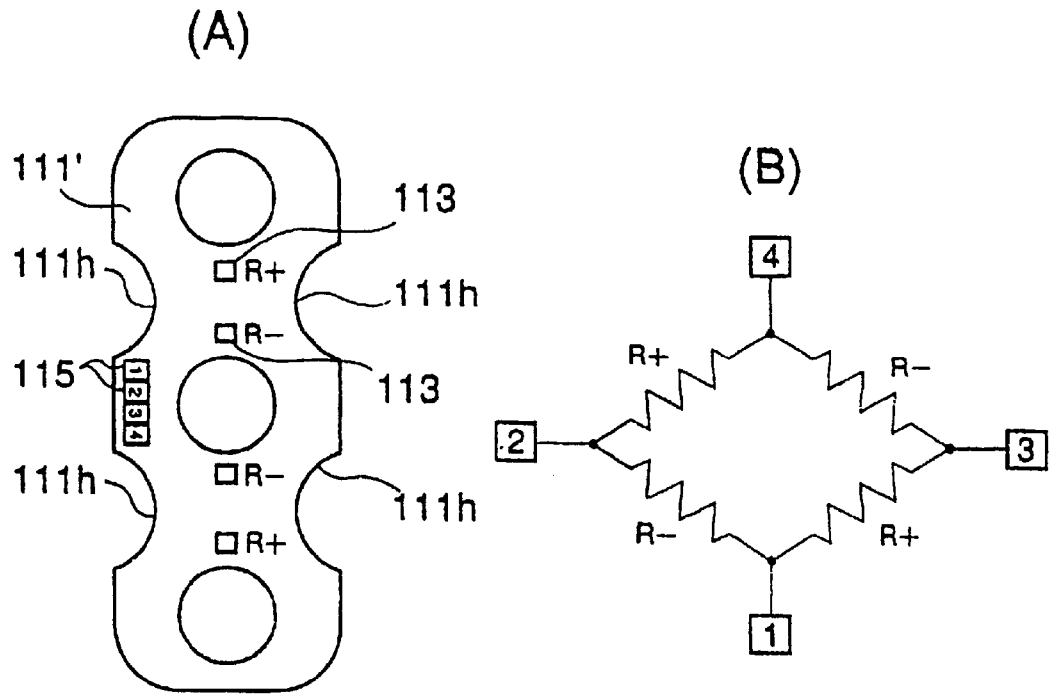

FIGS. 12(A) & 12(B) show an example of a variation of the sensor plate, in which FIG. 12(A) is a plan view of a sensor plate and FIG. 12(B) is a circuit diagram of the strain gauges.

In this example, arch-shaped constrictions (111h) are provided at both sides of a strain gauge region. The constrictions (111h) serve to localize the deformation of the sensor plate, thereby localizing the surface strain of the strain gauge region and stabilizing the sensitivity. The sensor plate (111') used here has dimensions of 30 mm in width and 80 mm in length. In addition, if sensor plate (111') has one end removed and the central portion fixed, a cantilever type sensor plate construction is obtained in which the load is applied on the other end.

Figure 13:
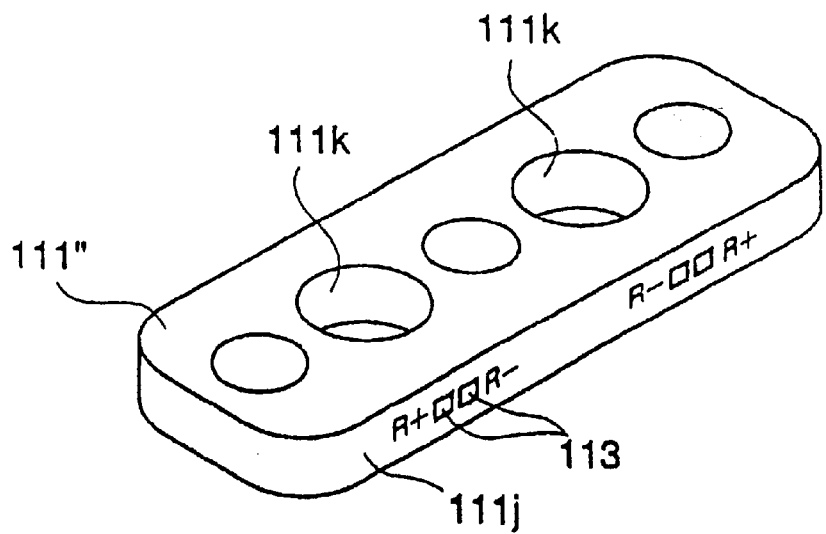
FIG. 13 is a perspective view of another variation example of the sensor plate.

FIG. 13 is a perspective view of another variation example.

In this example, strain gauges (113) are arranged on both side surfaces (111j) of a sensor plate (111"). In this figure, only the near side is visible but strain gauges are also arranged at far side. The sensor plate (111") of this example is provided with holes (111k) at the center of the regions in which the strain gauges (113) are attached. The action of the holes (111k) is the same as that of the constrictions (111h) in FIG. 12. The dimensions of the sensor plate (111") used in this example are 5 mm in thickness, 20 mm in width, and 80 mm in length.

FIGS. 6(A) & 6(B) show the construction of a seat weight measuring apparatus according to a further embodiment of the present invention in which FIG. 6(A) is a general sectional side view and FIG. 6(B) is a plan view of a plate spring.

In this embodiment, a head (125a) of a central shaft (125) enters into a hole (11a) of a seat rail (11) so that the restriction of the movement in longitudinal and lateral direction can take place between the both. Further, a plate spring (130) is used as a deflection member of a seat connecting mechanism. The plate spring (130) is, as shown in FIG. 6(B), substantially an elongated plate (material; SSC, thickness: 2 mm, length: 150 mm, width: 30 mm). The plate spring (130) is provided with a central shaft hole (130c) at the central portion and bolt holes (130a) at both end portions. The bolt holes (130a) are so-called free holes with diameters larger than the bolt diameter, so that dimensional errors of the members can be absorbed. The large oval hole (130b) provided at both side portions of the plate spring (130) has the purpose of preventing the interference of bolt (131) fixing the sensor plate (123) and a restriction rod (133). It has an additional purpose of weakening the plate spring so that the plate spring flexes sufficiently even at a small fulcrums interval (70 mm in this example, taken between centers of the bolt holes (130a)). In addition, the plate spring may have a bellows-like configuration in order to increase the deflection.

In the seat weight measuring apparatus according to the embodiment of FIG. 6, the displacement restriction between the seat rail (11) and the seat bracket (67) takes place as described below. The displacement in vertical direction is restricted by the abutting of the lower surface of the head of the bolt (131) against the upper surface of the sensor base (135) and abutting of the upper surface of the flange (133a) of the restriction rod (133) against the lower surface of the sensor base (135). The displacements in longitudinal and lateral directions are restricted by abutting of the outer periphery of the restriction rod (133) and the inner surface of the hole (135a) of the sensor base (135).

In this embodiment, the sensors are preferably arranged in short bridge. The short bridge means here a sensor plate with very little deflection which has merit of decreased size and cost. Disposed around the outer periphery of the central shaft between the sensor plate (123) and the plate spring (130) is a washer (127). By adjusting the configuration (diameter) of this washer, the sensitivity of the sensor can be adjusted.

Figure 6:
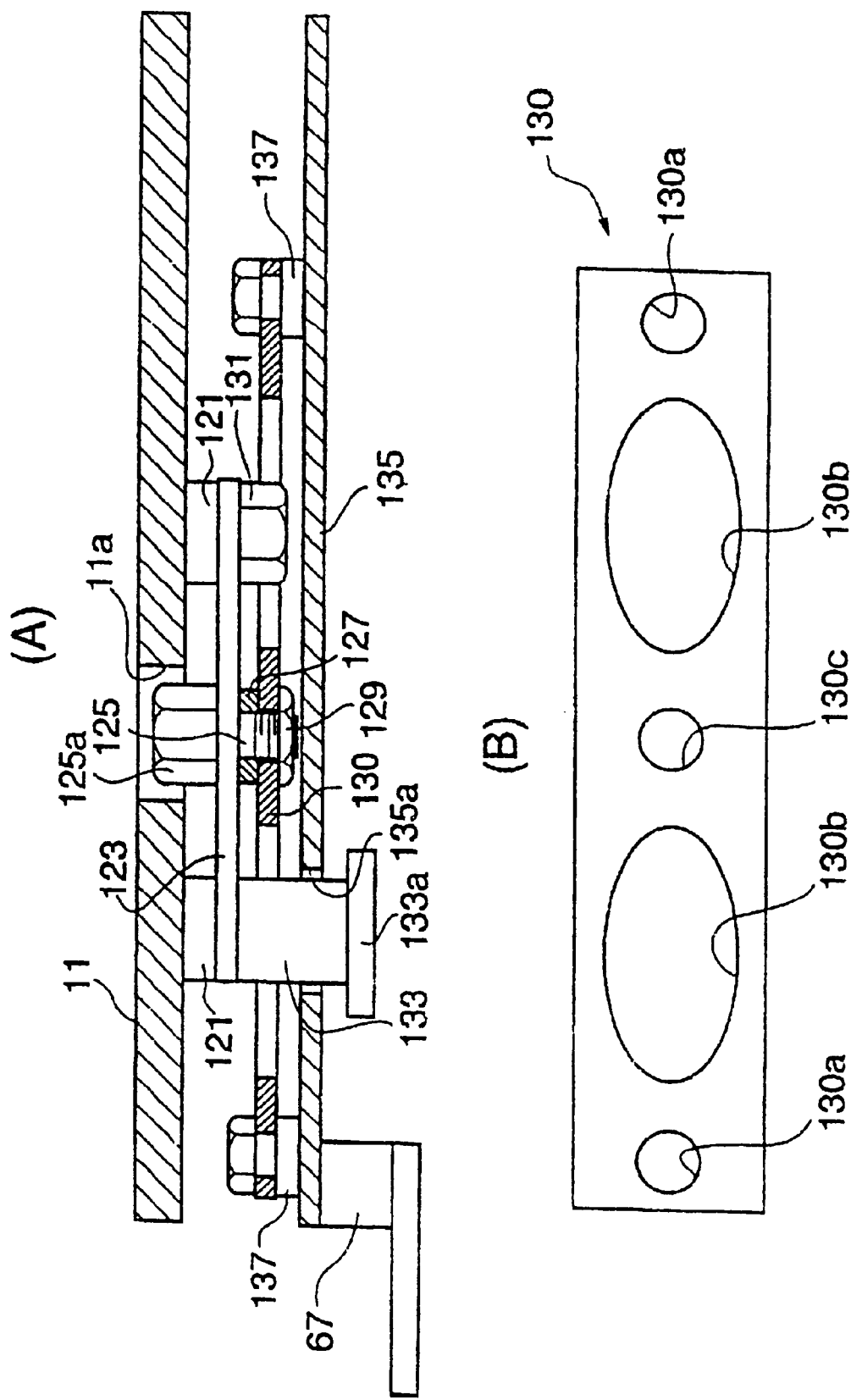

The other feature of the embodiment of FIG. 6 is that accuracy of the sensor is improved since the deflection member absorbs asymmetrical stress.

FIGS. 7(A) & 7(B) show the construction of a seat weight measuring apparatus according to a further embodiment of the present invention in which FIG. 7(A) is a general sectional side view and FIG. 7(B) is a plan view showing a sensor plate and plate spring.

In this embodiment, a sensor plate (153) is laid on a plate spring (155). The plate spring (155) is a plate made of spring steel with a thickness of 2 mm, a width of 60 mm, and a length of 80 mm. The sensor plate (153) is a plate made of stainless spring steel with a thickness of 0.5 mm, a width of 20 mm, and a length of 80 mm. The sensor plate (153) and the plate spring (155) receive at the central portion the load of seat rail (11) acting via a pedestal (151), and are supported at both end portions by pedestals (160) located on a sensor base (159). Accordingly, the sensor plate (153) and the plate spring (155) are connected in parallel connection and bear the said load on shares. The sensor plate and the plate spring are in the sharing ratio around 1:9–1:19.

The plate spring (155) is provided with a pair of large lightening holes (155a) on both sides. The strain gauges (154) are attached on the upper surface of the sensor plate (153) at locations corresponding to the edges of the holes (155a). This construction has an advantage that a large deflection stroke can be obtained for a short span.

This embodiment is an example in which the load is shared between the strain sensor and the spring to secure both strength and vertical strain stroke. Generally speaking, a sensor plate constituting a load sensor with good temperature characteristics has a different construction from a plate spring. In this embodiment, the plate spring secures a deflection stroke of over ±1 mm for vertical load. When the stress is concentrated on the strain detecting region in order to raise the sensitivity of the load sensor, the sensor plate deforming together with the spring material is subject to a deterioration because of a large deflection. Against this, the sensor plate is constructed with a thin material, thus dividing the strength and the function. The construction of this embodiment can also be constructed with a decreased thickness enabling the arrangement under the seat rail.

Figure 7:
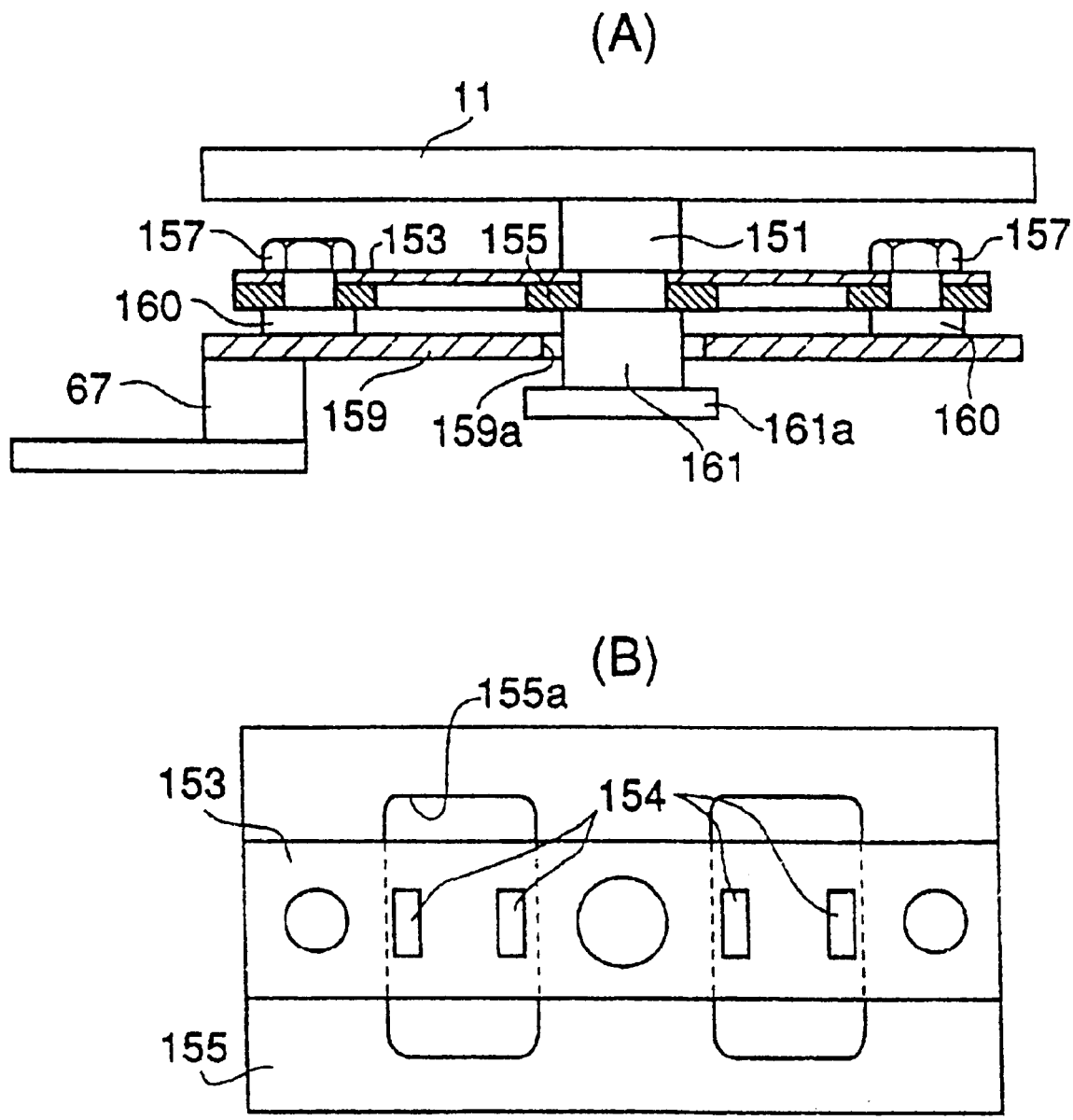

In the embodiment of FIG. 7, the displacement restriction mechanism is formed between a restricting rod (161) located under the seat rail pedestal (151) and a sensor base hole (159a).

Figure 8:
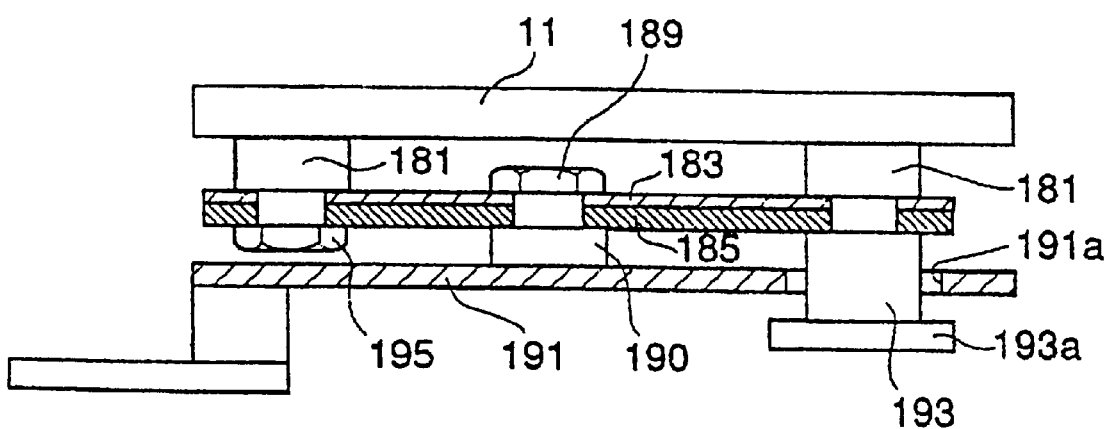
FIG. 8 is a sectional side view showing an alternative example of the seat weight measuring apparatus of FIG. 7.

FIG. 8 is a sectional side view showing a variation example of the seat weight measuring apparatus of FIG. 7. In this embodiment, both end portions of a sensor plate (183) and a plate spring (185) are fixed to pedestals (181) one the lower surface of the seat rail (11), and the central portions of the sensor plate (183) and the plate spring (185) are fixed to a pedestal (190) on a sensor base (191). Further, a restriction rod (193) projects downward from an end portion of the sensor plate (183). Such an arrangement with the axes of the restriction rod (193) and the sensor plate (183) arranged offset has an effect that the displacement restriction takes place at a location where the stress is more concentrated.

FIGS. 9(A) & 9(B) show a seat weight measuring apparatus according to a further embodiment of the present invention having a cantilever construction, in which FIG. 9(A) is a sectional side view and FIG. 9(B) is a plan view of a plate spring.

Also in this embodiment, a plate spring (203) and a sensor plate (205) is arranged in parallel. The left end of a spring plate (203) and a sensor plate (205) are fixed onto a sensor base (207) by means of a bolt (209), the sensor base (207) supporting them in a cantilever fashion. The right end portion of the spring plate (203) and the sensor plate (205) are fixed to a pedestal (201) located under a seat rail (11). A displacement restriction mechanism is formed between a restriction rod (211) under the pedestal (201) and the sensor base (207).

The use of a cantilever construction as in this embodiment offers an effect that a large displacement can be obtained for a short span.

Figure 9:
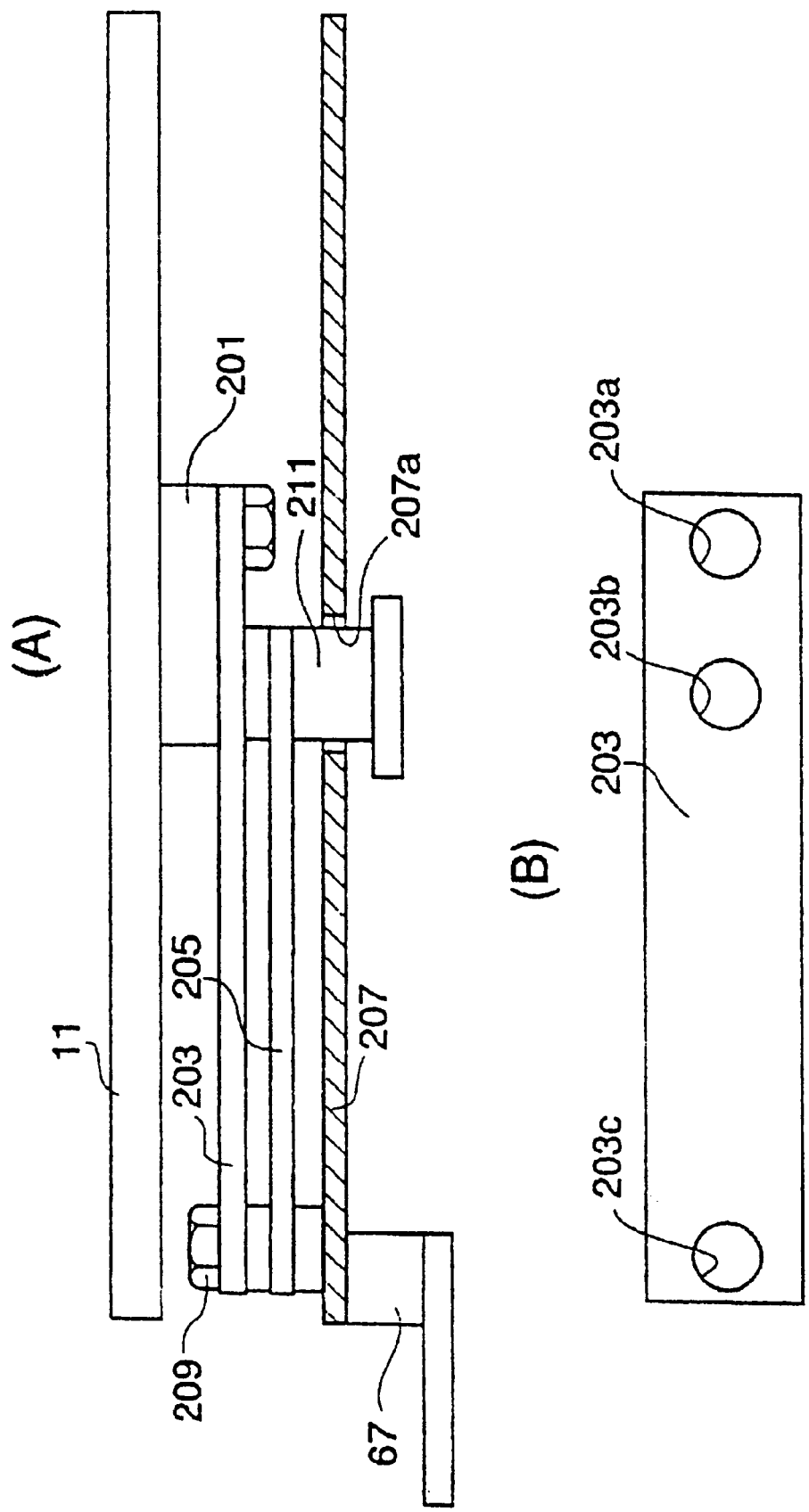
Figure 10:
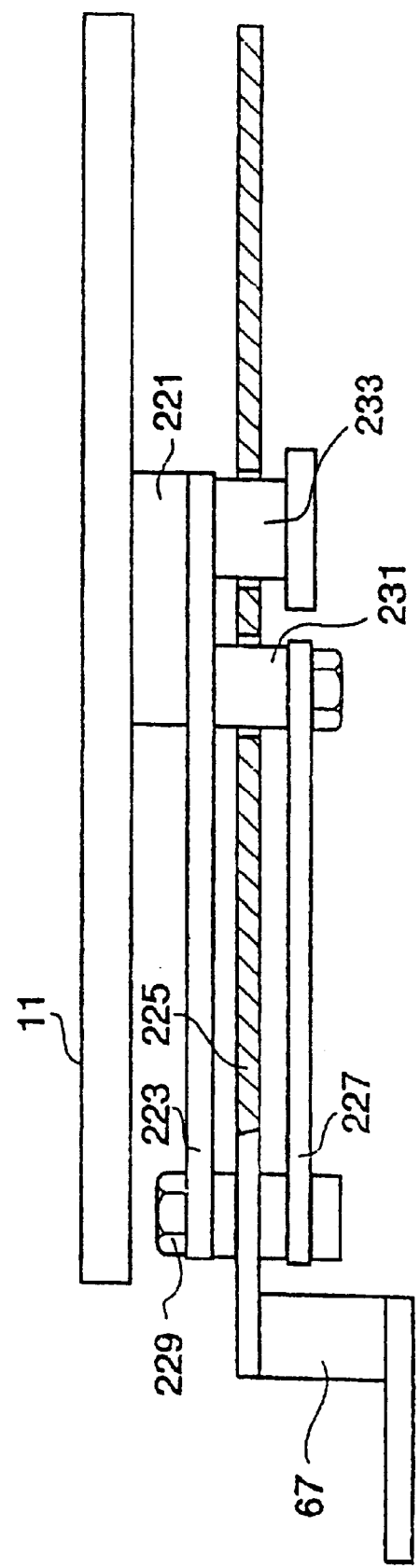
FIG. 10 is a sectional side view showing an alternative example of the embodiment of FIG. 9.

FIG. 10 is a sectional side view showing a variation example of the embodiment of FIG. 9. In this embodiment, a sensor plate (227) is arranged under a sensor base (225). This arrangement offers an effect that, by increasing the distance between the sensor plate (227) and a plate spring (223), the sensitivity of the sensor is stabilized since an axis through a rod (231) displaces in parallel with an axis (229) thus decreasing the weight detecting error when the seat is inclined in the longitudinal direction. In addition, the distance between a seat rail (11) and a seat bracket (67) can be further decreased.

Further, in the embodiment of FIG. 10, two rods (231, 233) project downward penetrating the sensor base (225). Either of these rods can be used for the displacement restriction mechanism.

Figure 11:
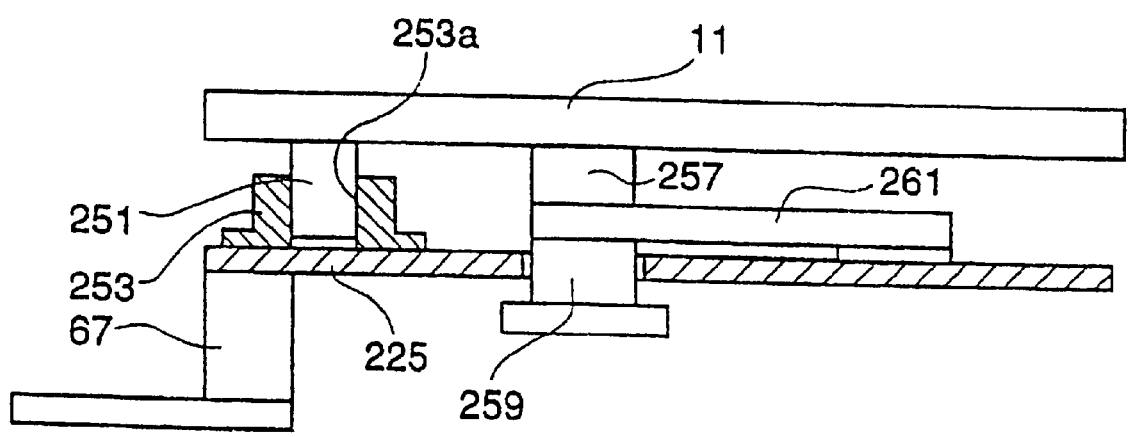
FIG. 11 is a sectional side view showing a further alternative example of the cantilever type seat weight measuring apparatus.

FIG. 11 is a sectional side view showing a further variation example of the cantilever type seat weight measuring apparatus. In this embodiment, a protrusion (251) projects downward from a seat rail (11) which fits into a hole (253a) of a block (253) provided on a sensor base (225). This protrusion (251) and block (253) constitute an independent displacement restriction mechanism.

A sensor plate (261) is fixed to a pedestal (257) at its left end, and is fixed to the sensor base (225) at its right end.

The other feature of this embodiment is that it can be constructed in such a manner as to restrict the inclination of the seat rail with the independent displacement restriction mechanism so that only vertical movement is transmitted to the sensor.

The present invention is by no means limited to the embodiments described above, but various modifications can be made according to the basic concepts which are claimed in the claims.

Effects of the Invention

As can be seen from the foregoing description, the present invention offers the following effects.

By providing displacement restriction mechanisms which restrict the relative displacement between the seat and the seat rails within a certain range and bear the excess load, the breaking load of the load sensors can be decreased and a low-cost construction of the apparatus is achieved.

By setting the deflection stroke of the seat connecting mechanisms and the load sensors at 0.5–8 mm, the deflection corresponding to the load variation within the measuring range or loading range of the load sensors, the seat weight measuring apparatus can be incorporated without problems even at the current dimensional precision level of the seat rails or seat brackets. Further, by incorporating deflection members into the seat connecting mechanisms, the deflection stroke of the seat connecting mechanisms within the measuring range of the load sensors can be amplified. As a result, the dimensional precision and the assembly precision of the members constituting the seat connecting mechanisms and the displacement restriction mechanisms can be alleviated.

Further, the present invention provides a seat weight measuring mechanism having such advantages as decreased overall thickness of the apparatus and decreased processing cost and assembly cost. In addition, it provides a seat weight measuring mechanism capable of improving the safety against an abnormal force acting on the seat. Additionally, a weight measurement with higher precision and higher linearity can be achieved.

The priority document here, Japanese application H10-172098, filed on Jun. 5, 1998, is hereby incorporated by reference.

We claim:

1. A seat weight measuring apparatus for measuring the weight of a vehicle seat including the weight of a passenger sitting thereon, comprising:

seat connecting mechanisms including deflection members, arranged between seat fixing elements attached to the vehicle and the seat;

load sensors for detecting the weight loaded on the seat connecting mechanisms; and displacement restriction mechanisms for restricting a displacement of the seat relative to the seat fixing elements, within a predetermined range; and, wherein the load sensors are located below a seat rail which is attached to an underside of the seat.

2. A seat weight measuring apparatus as claimed in claim 1, wherein the apparatus is configured so that the deflection of the seat connecting mechanisms due to load variations within a measuring range of the load sensors is within a range of between approximately 0.5 to approximately 8 mm.

3. A seat weight measuring apparatus as claimed in claim 1, wherein said displacement restriction mechanisms are configured to tolerate a displacement of ±0.25 to 8 mm and withstand a load of at least 300 kgf.

4. A seat weight measuring apparatus as claimed in claim 1, wherein the load sensors are provided with detecting members; and wherein the deflection members are members having spring characteristics, and are connected in series with the load sensors.

5. A seat weight measuring apparatus as claimed in claim 1, wherein the load sensors are provided with detecting members; and wherein the deflection members serve as detecting members of the load sensors.

6. A seat weight measuring apparatus as claimed in claim 1, wherein the displacement restriction mechanisms are positioned in locations offset from loading axes of the seat connecting mechanisms.

7. A seat weight measuring apparatus as claimed in claim 1, wherein the displacement restriction mechanisms restrict movements of the seat in vertical, longitudinal and lateral directions.

8. The seat weight measuring apparatus of claim 1, wherein each load sensor is provided with a strain detecting member having a plurality of strain gauges;

wherein the strain gauges are positioned on the strain detecting member at regions having constrictions at the sides.

9. A seat weight measuring apparatus for measuring the weight of a vehicle seat including the weight of a passenger sitting thereon comprising:

seat fixing elements positioned on a vehicle;

a plurality of seat rails attached to an underside of the seat;

seat connecting mechanisms arranged at four corners of the seat between the seat fixing elements and the seat rails;

load sensors for detecting the weight loaded on the seat connecting mechanisms; and displacement restriction mechanisms for restricting a displacement of the seat rails relative to the seat connecting mechanisms in a predetermined range, wherein the load sensors are located below the seat rails.

10. A seat weight measuring apparatus for measuring the weight of a vehicle seat including the weight of a passenger sitting thereon, comprising:

seat fixing elements positioned on a vehicle;

a plurality of seat rails attached to an underside of the seat;

seat connecting mechanisms including deflection members arranged at four corners of the seat between the seat fixing elements and the seat rails;

load sensors for detecting the weight loaded on the seat connecting mechanisms; and displacement restriction mechanisms for restricting a displacement of the seat rails relative to the seat connecting mechanisms, in a predetermined range, and wherein the load sensors are located below the seat rails.

11. A seat weight measuring apparatus as claimed in claim 10, wherein anchoring portions of a seat belt are connected to the seat rails; and wherein the displacement restriction mechanisms are positioned in the vicinities of the anchoring portions.

12. A seat weight measuring apparatus as claimed in claim 10, wherein anchoring portions of a seat belt are connected to the seat rails; and wherein the displacement restriction mechanisms are positioned in the vicinities of the anchoring portions, and wherein the displacement restriction mechanisms positioned in the vicinities of the anchoring portions are rigid members capable of withstanding a load of approximately 2300 kgf.

13. The seat weight measuring apparatus of claim 9, wherein each load sensor is provided with a strain detecting member having a plurality of strain gauges;

wherein the strain gauges are positioned on the strain detecting member at regions having constrictions are formed at the sides, wherein the strain gauges of each load sensor being arranged symmetrically relative to a central axis of the load sensor's strain detecting member and wherein each load sensor is constructed so that a twisting strain around the central axis of its strain detecting member is not output by the strain detecting member.

14. A seat weight measuring apparatus as claimed in claim 9, wherein anchoring portions of a seat belt are connected to the seat rails; and wherein the displacement restriction mechanisms are positioned in the vicinities of the anchoring portions.

15. A seat weight measuring apparatus as claimed in claim 9, wherein anchoring portions of a seat belt are connected to the seat rails; and wherein the displacement restriction mechanisms are positioned in a plurality of locations including the vicinities of the anchoring portions, and wherein the displacement restriction mechanisms positioned in the vicinities of the anchoring portions are rigid members capable of withstanding a load of approximately 2300 kgf.

* * * * *